Patented Jan. 17, 1939

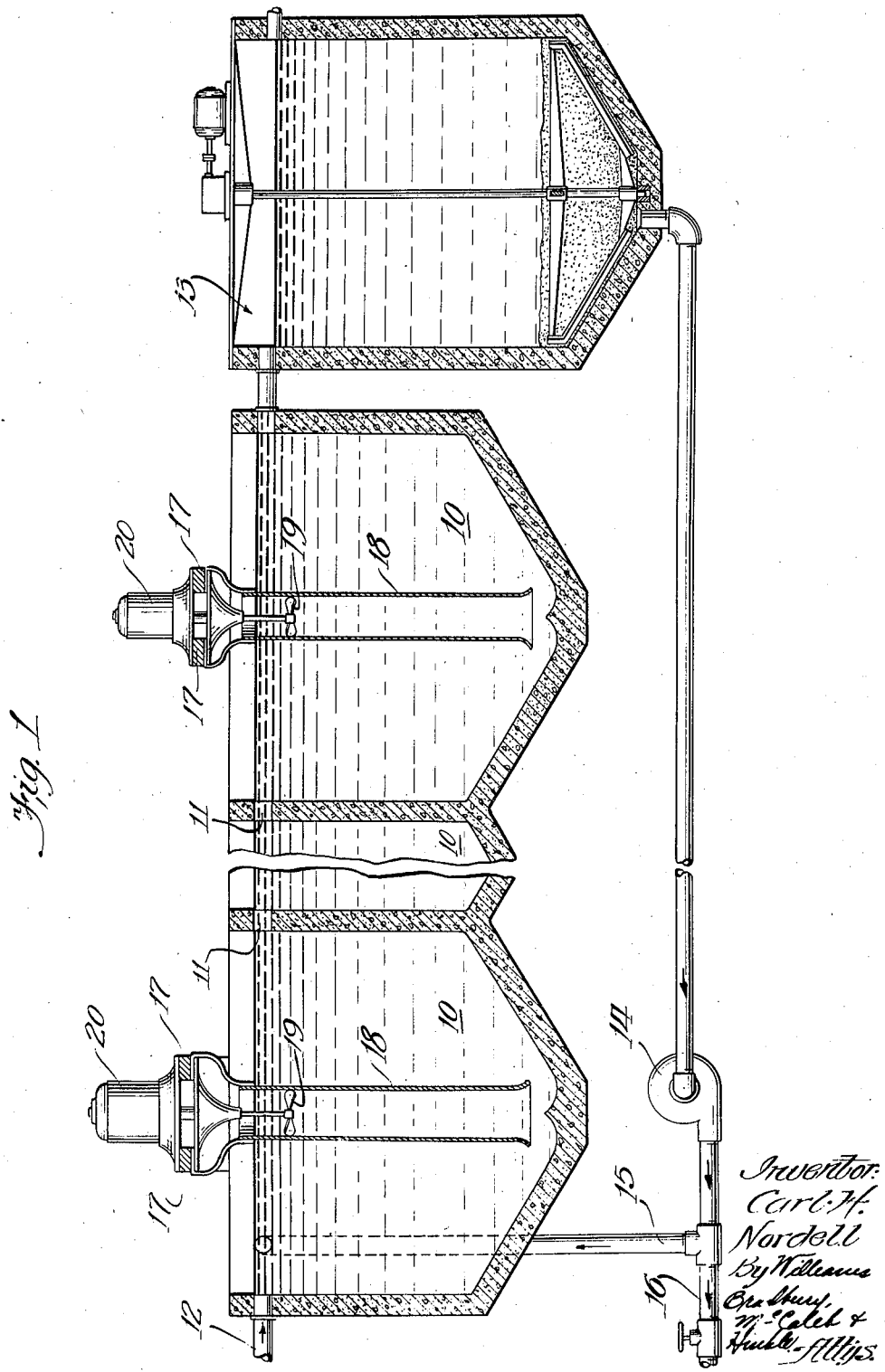

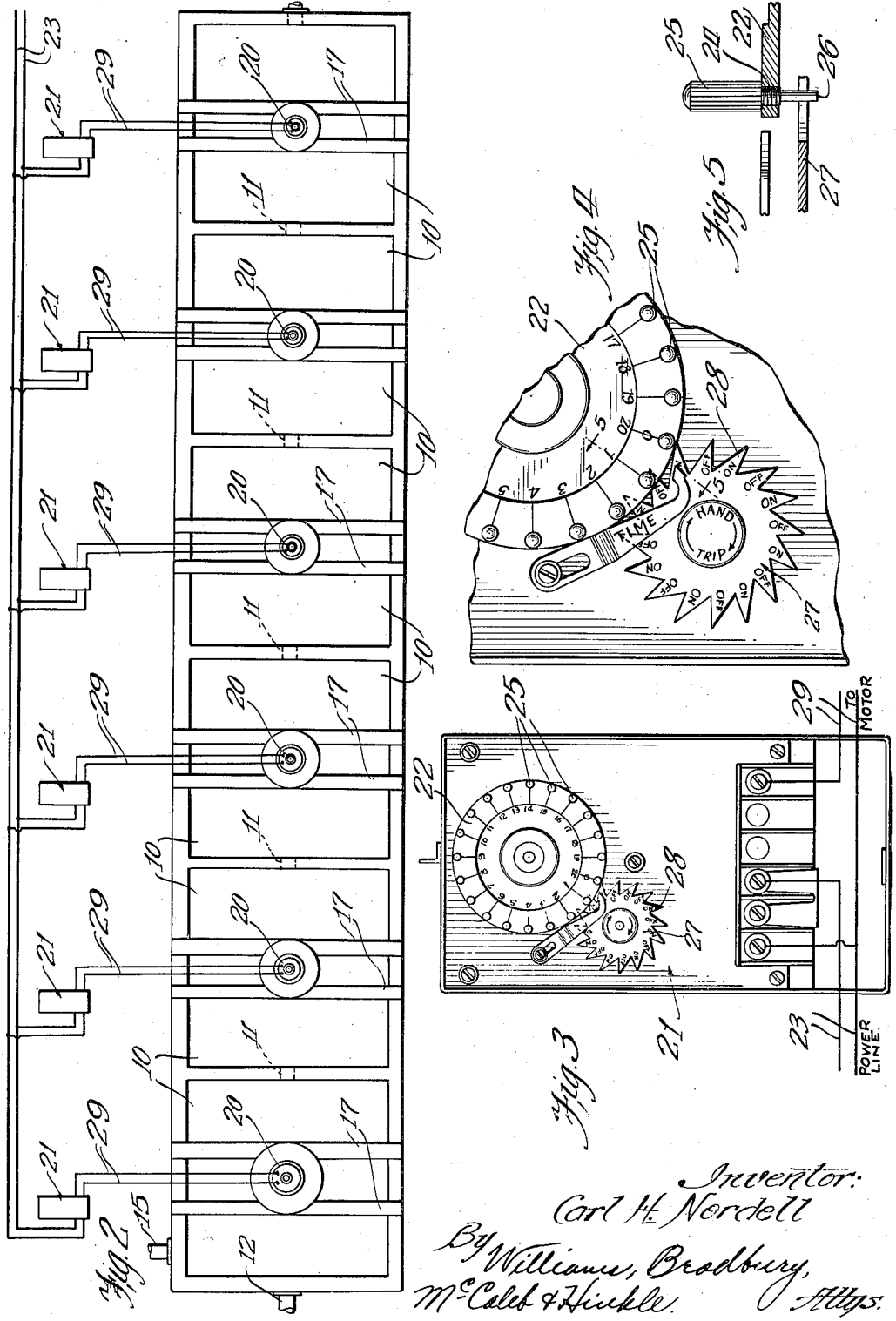

2,144,386

UNITED STATES PATENT OFFICE 2,144,386

APPARATUS FOR SEWAGE TREATMENT

Carl H. Nordell, Chicago, Ill., assignor to Advance Engineering Company, Chicago, Ill., a corporation of Illinois Application December 14, 1936, Serial No. 115,772

3 Claims. (Cl. 210—8)

This invention relates to apparatus for the treatment of sewage according to the so-called activated sludge process.

In the activated sludge process the sewage, together with a predetermined amount of return sludge, is subjected to aeration for a period of several hours, with the final result that a sludge is produced which settles out leaving a clear, purified effluent which may be discharged into streams and lakes without objectionable results.

According to the present invention I provide an apparatus comprising a series of separate tanks through which the liquid being treated flows seriatim without back flow. These tanks may be advantageously of the same size.

In my patent application Serial No. 41,751 filed September 23, 1935, I have described and claimed a method in which the aeration is controlled throughout the course of treatment in accordance with the oxygen demand which varies along said course. This varying oxygen demand I can readily determine with the aid of my testing device described and claimed in my copending application Serial No. 41,750 filed September 23, 1935.

The present invention will readily be understood with reference to the accompanying drawings, in which:

Figure 1 is a sectional view through an apparatus embodying my invention;

Fig. 2 is a plan view of the treatment tanks thereof;

Fig. 3 is a plan view of a time clock for controlling an aerator;

Fig. 4 is a fragmentary plan view on an enlarged scale, and

Fig. 5 is a sectional detail view, taken on the line 5—5 of Fig. 4.

Referring to the drawings, the reference numerals 10 designate aeration tanks arranged in series. These tanks are connected by relatively small overflow conduits 11 so that liquid passes through the tanks from left to right, as viewed in Fig. 1. The sewage enters the first tank 10 by a conduit 12 and the last tank 10 discharges into a settling tank 13. Clear, purified effluent overflows from the settling tank 13 and may be discharged into lakes, streams, or the like. The sludge settles to the bottom of tank 13 and is withdrawn by the pump 14. Part of the sludge is returned to the first tank by a pipe 15. The remainder passes by a valved pipe 16 to any suitable location for further treatment.

Any suitable number of tanks 10 may be provided. In the embodiment illustrated I contemplate six tanks. Preferably, for the sake of economy, I build the tanks of the same size and in a row. Each tank is provided with a mechanical aerator which may be supported on beams 17. The aerator may suitably comprise a tube 18 which extends from a point above the surface of the liquid to a point near the bottom of the tank. Within the tube 18 is located a propeller 19 which is driven directly from an electric motor 20. When the motor is in operation the propeller 10 draws liquid upwardly from the bottom of the tank, thoroughly agitates it in the presence of air, and distributes it over the surface of the liquid. In this way the liquid is thoroughly aerated and the solids are maintained in a state of suspension which enables them to pass through the tanks in series and into the settling tank 13.

For the reasons fully described in my aforesaid application Serial No. 41,751, the amount of air required in the tanks 10 decreases progressively. Thus, in the first tank, a very considerable demand for oxygen exists. The demand of the second tank is usually considerably less while still substantial. The demand of the subsequent tanks diminishes progressively.

To meet the varying demand for oxygen I prefer to use a large motor in the first tank and progressively smaller motors in the second and third tanks. The motors at the end of the series of tanks may be of the same size, if desired. In any event, the motors will have to be sufficiently powerful to take care of the maximum aeration demand which may at any time exist in the plant. According to the present invention I provide means for controlling the motors 20 individually and to cause them to operate intermittently for varying periods of time, to effect the degree of aeration which is necessary under prevailing conditions without excessive waste of power. To attain these results I provide each motor with a time switch 21 which can be adjusted for automatic alternate open and closing of the motor switch for selected periods of time. The time switch 21 may be of any suitable or preferred construction and standard switches can be purchased on the market which are effective for this purpose.

The switch 21, shown in Figs. 3, 4 and 5, comprises a disc 22 which is constantly driven by an electric clock which is energized by the power lines 23. The disc 22 is provided around its periphery with equally spaced threaded openings 24 which are adapted to receive pins 25. Each pin 25 comprises a lower portion 26 which extends into the plane of the star wheel 27. This star wheel is adapted to be moved step by step by the engagement of the pins 25 with the teeth 28. The star wheel 27 is so arranged that each step movement moves the switch on and off alternately. When the switch is on, the power lines 23 are connected to the leads 29 of the motor 20. It will readily be understood that pins 25 may be inserted in the disc 22 so as to give any desired ratio between time of operation of the motor and time of rest. If the sewage is particularly strong and the demand for oxygen is such that the whole capacity of the motor 20 is needed, then all the pins 25 may be removed from the disc and the star wheel 27 arranged so that it is in a switch closing position. Consequently, the motor 20 will rotate continuously. However, should the oxygen demand amount to about 75% of the maximum, then I locate pins 25 on the disc 22 so as to cause the motor to operate for a certain length of time and to stop for one-third of that period. I may do this by placing pins in the 1st, 4th, 5th, 8th, 9th, etc., opening 24. I must use an even number of pins to get the same cycle for each rotation of the disc 22. It is important to make sure that the pin in the opening No. 1 engages the star wheel 27 to close the switch. Of course, it will be understood that any other desired ratio of period of operation of the motor to period of rest of the motor may be very closely attained by the suitable location of the pins 25 in the disc 22.

The improved apparatus may be operated in any of several ways. Thus, I may be operating with a certain distribution of pins on the disc 22. Just before the motor starts I may take a sample of liquid and determine the oxygen content. This may be done by any of the well known chemical methods. For example, the sample may be dosed with a definite amount of copper sulphate solution to arrest oxygen utilization by the sludge and the oxygen content is then determined. If the liquid contains a substantial amount of oxygen, the indication is that excessive aeration is being employed and the pins 25 may be redistributed so as to give a relatively longer period of rest for the motor. The optimum condition would be that the liquid in each tank 10 would use up all dissolved oxygen just at the time that the motor 20 is about to start again. For operating efficiency, the oxygen content at the beginning of the operation of the motor 20 should be quite close to zero since the oxygen is absorbed by the water much more efficiently at that oxygen level than at a higher level. Under-aeration should be carefully avoided, but that condition is absent when the liquid cntains some oxygen at the end of the rest period. I have discovered that if there is some available oxygen present, the rate of oxygen utilization by the mixed liquid is independent of the degree of its saturation with oxygen.

According to another method of operation, I determine, with the aid of my testing device described and claimed in the aforesaid application Serial No. 41,750, an oxygenating curve of the type shown in my aforesaid copending application Serial No. 41,751. This curve I divide into six parts, corresponding to the number of tanks 10. From each of these parts I find directly the number of parts by weight of oxygen per million parts of liquid which each tank requires.

The oxygen dissolving capacity of each tank 10 and its motor 20 under normal operating conditions can be predetermined and consequently it only remains to arrange the pins 25 on the disc 22 so that the operating and inoperative periods of each motor 20 are arranged to insure the dissolution of the amount of oxygen required.

The oxygen dissolving capacity under normal conditions can be determined in several ways. One simple way is to operate the apparatus in the manner first described; that is, in a manner which keeps the oxygen content of the liquid approximately slightly above zero. Under these conditions the dissolution of oxygen is most efficient and owing to the presence of some oxygen it is known that the oxygen demand of the liquid is being taken care of. When this condition is obtained there will be a definite relation between the on and off periods determined by the clock 21. The rate of oxygen utilization in each tank is now determined with the aid of the testing device described and claimed in my aforesaid application Serial No. 41,750. It is a mere matter of simple arithmetic to determine from these facts the rate of oxygen dissolution effected by each aerator under normal operating conditions.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In a sewage treatment apparatus, a series of aeration tanks, conduit means connecting them in series preventing back flow of liquid therethrough, a mechanical aerator in each tank, each aerator being arranged to operate exclusively on the liquid in the tank in which it is located intermittently operating means for driving each aerator, and automatic means adapted to be set to control the condition of operation and rest of each operating means for definite periods of time in accordance with the demand for oxygen of the liquid in each tank.

2. In a sewage treatment apparatus, a series of aeration tanks, conduit means connecting them in series preventing back flow of liquid therethrough, a mechanical aerator in each tank, a motor for each aerator, and a time switch controlling the intermittent operation of each motor for predetermined periods of aeration and rest.

3. In a sewage treatment apparatus, a series of aeration tanks, conduit means connecting them in series preventing back flow of liquid therethrough, a mechanical aerator in each tank, a motor for each aerator, and a time switch controlling the intermittent operation of each motor for predetermined periods of aeration and rest, said time switch comprising adjustable means whereby the ratio and duration of said periods may be changed at will.

CARL H. NORDELL.